(12) United States Patent
Yoo (10) Patent No.: US 8,767,395 B2
(45) Date of Patent: Jul. 1, 2014

(54) SLIM-TYPE CRADLING APPARATUS FOR PORTABLE TERMINAL

(75) Inventor: Chung-Keun Yoo, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 101 days.

(21) Appl. No.: 13/345,822

(22) Filed: Jan. 9, 2012

(65) Prior Publication Data

US 2012/0224305 A1 Sep. 6, 2012

(30) Foreign Application Priority Data

Mar. 2, 2011 (KR) .................. 10-2011-0018561

(51) Int. Cl.
*G06F 1/16* (2006.01)

(52) U.S. Cl.
USPC .............. 361/679.56; 361/679.55; 16/305; 16/321; 16/334; 16/252; 248/176.3; 248/671; 248/292.13; 248/346.04; 248/346.06

(58) Field of Classification Search
USPC .......... 361/679.55, 679.56; 16/305, 321, 334; 248/671, 292.13, 346.04, 346.06, 918
See application file for complete search history.

(56) References Cited

U.S. PATENT DOCUMENTS

| | | | |
|---|---|---|---|
| 6,148,481 A * | 11/2000 | Chen | 16/334 |
| 6,353,968 B1 * | 3/2002 | Shyu et al. | 16/334 |
| 6,517,040 B1 * | 2/2003 | Wen | 248/278.1 |
| 6,568,741 B1 * | 5/2003 | Leung et al. | 296/146.11 |
| 7,448,585 B2 * | 11/2008 | Skiba | 248/286.1 |
| 7,516,935 B2 * | 4/2009 | Liang et al. | 248/676 |
| 7,681,859 B2 * | 3/2010 | Kim | 248/688 |
| 7,841,575 B1 * | 11/2010 | Sliger | 248/454 |
| 8,089,760 B2 * | 1/2012 | Yi-Chang | 361/679.59 |
| 8,111,512 B2 * | 2/2012 | Yeh et al. | 361/679.59 |
| 8,152,113 B2 * | 4/2012 | Chen et al. | 248/150 |
| 8,199,473 B2 * | 6/2012 | Zhou | 361/679.22 |
| 8,243,427 B2 * | 8/2012 | Fu | 361/679.21 |
| 8,243,432 B2 * | 8/2012 | Duan et al. | 361/679.3 |
| 8,256,725 B2 * | 9/2012 | Wang et al. | 248/157 |
| 8,262,053 B1 * | 9/2012 | Zhao | 248/676 |
| 8,390,995 B2 * | 3/2013 | Wang et al. | 361/679.21 |
| 8,400,767 B2 * | 3/2013 | Yeom et al. | 361/679.59 |
| 2002/0088918 A1 * | 7/2002 | Uto et al. | 248/688 |
| 2005/0050683 A1 * | 3/2005 | Tonogai | 16/305 |
| 2005/0071952 A1 * | 4/2005 | Chen | 16/252 |
| 2005/0139740 A1 * | 6/2005 | Chen et al. | 248/286.1 |
| 2006/0109617 A1 * | 5/2006 | Chen et al. | 361/683 |
| 2006/0150368 A1 * | 7/2006 | Chiang | 16/252 |
| 2007/0177343 A1 * | 8/2007 | Hsia | 361/683 |
| 2007/0262210 A1 * | 11/2007 | Oh et al. | 248/125.1 |
| 2008/0029412 A1 * | 2/2008 | Ho et al. | 206/320 |
| 2008/0047103 A1 * | 2/2008 | Lee | 16/321 |
| 2009/0244832 A1 * | 10/2009 | Behar et al. | 361/679.55 |

(Continued)

FOREIGN PATENT DOCUMENTS

KR 10-2006-0073085 A 6/2006
KR 10-2010-0021392 A 2/2010

*Primary Examiner* — David M Sinclair
*Assistant Examiner* — Robert Brown
(74) *Attorney, Agent, or Firm* — Cha & Reiter, LLC (57) ABSTRACT

Provided is a slim-type cradling apparatus for a portable terminal. The disclosed cradling apparatus includes a cradling body and a retaining device interworking with rotation of the cradling body to support a closed state and a rotated state of the cradling body.

19 Claims, 5 Drawing Sheets

(56) References Cited

U.S. PATENT DOCUMENTS

| | | | |
|---|---|---|---|
| 2009/0268396 A1* | 10/2009 | Tang | 361/679.55 |
| 2009/0268397 A1* | 10/2009 | Tang | 361/679.55 |
| 2009/0268398 A1* | 10/2009 | Tang | 361/679.55 |
| 2010/0059649 A1* | 3/2010 | Buxton | 248/371 |
| 2010/0072334 A1* | 3/2010 | Le Gette et al. | 248/176.3 |
| 2010/0213331 A1* | 8/2010 | Liou | 248/176.3 |
| 2010/0224744 A1* | 9/2010 | Curatolo et al. | 248/176.3 |
| 2010/0252710 A1* | 10/2010 | Yang et al. | 248/398 |
| 2011/0038119 A1* | 2/2011 | Yeh | 361/679.27 |
| 2011/0069446 A1* | 3/2011 | Trang | 361/679.55 |
| 2011/0164358 A1* | 7/2011 | Duan et al. | 361/679.01 |
| 2011/0317338 A1* | 12/2011 | Chen et al. | 361/679.01 |
| 2012/0006950 A1* | 1/2012 | Vandiver | 248/176.3 |
| 2012/0025684 A1* | 2/2012 | Trotsky | 312/334.1 |
| 2012/0079682 A1* | 4/2012 | Cheng | 16/252 |
| 2012/0126087 A1* | 5/2012 | Curatolo et al. | 248/346.06 |
| 2012/0168577 A1* | 7/2012 | Cheng | 248/176.3 |

* cited by examiner

SLIM-TYPE CRADLING APPARATUS FOR PORTABLE TERMINAL

CLAIM OF PRIORITY

This application claims the benefit under 35 U.S.C. §119 of a Korean Patent Application filed in the Korean Intellectual Property Office on Mar. 2, 2011 and assigned Serial No. 10-2011-0018561, the entire disclosure of which is hereby incorporated by reference.

BACKGROUND OF THE INVENTION

1. Field of the Invention

The present invention relates to a portable terminal, and more particularly, to a cradling apparatus for positioning a portable terminal at a predetermined angle.

2. Description of the Related Art

Generally, a portable terminal refers to an information device such as a cellular phone, a smart phone, a note book, a Personal Digital Assistant (PDA), a tablet Personal Computer (PC), or the like. These devices can now provide, in addition to voice and data functions, various other functions, such as a Digital Multimedia Broadcasting (DMB) function, a TV watching function, an Internet function, a high-pixel camera photographing function, a moving picture capturing function, etc. In order to provide various functions, the size of a main body of the portable terminal increases, thus making it inconvenient to carry the portable terminal. For this reason, many efforts in miniaturization, lightweightness, and slimness are being made in a multimedia field.

To facilitate user's viewing experience, a portable terminal is equipped with a large-width display device and a cradling apparatus mounted on a bottom surface of a main body of the portable terminal. The cradling apparatus may be manufactured independently for use with the portable terminal, or may be integrated on the main body of the portable terminal.

Examples of cradling apparatuses used in conventional portable terminals are disclosed in Korean Patent Publication Nos. 2010-021392 and 2006-73085 and U.S. Patent Publication No. 2010/0224744. However, the disclosed cradling apparatus used in the portable terminals make it difficult to achieve the slimness of the portable terminals.

As mentioned previously, the miniaturization, lightweightness, and slimness of portable terminals are important factors in improving the portability of the terminals. However, the cradling apparatus typically provided on the bottom surface of the main body of the portable terminal is externally exposed and hinders the slimness of the portable terminal.

SUMMARY OF THE INVENTION

Accordingly, an aspect of the present invention is to provide a slim-type cradling apparatus for a portable terminal that can be conveniently opened and closed.

Another aspect of the present invention is to provide a slim-type cradling apparatus provided on a bottom surface of a main body of a portable terminal.

According to an aspect of the present invention, there is provided a cradling apparatus for inclinedly supporting a main body of a portable terminal. The cradling apparatus includes a cradling body and a retaining device interworking with rotation of the cradling body to support a closed state and a rotated state of the cradling body.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION OF THE INVENTION

Hereinafter, a slim-type cradling apparatus included in a portable terminal according to an exemplary embodiment of the present invention will be described in detail with reference to the accompanying drawings. Throughout the drawings, identical components will be referred to by identical reference numerals. The portable terminal may be an information device of a type such as a smart phone, a tablet PC, or the like.

Figure 1:
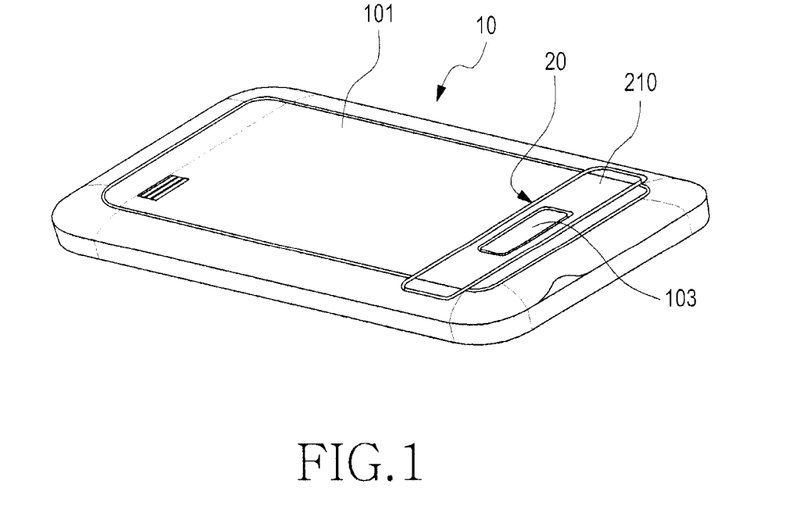
FIG. 1 is a perspective view of a bottom surface of a portable terminal equipped with a cradling apparatus in a closed state according to the present invention.
Figure 2:
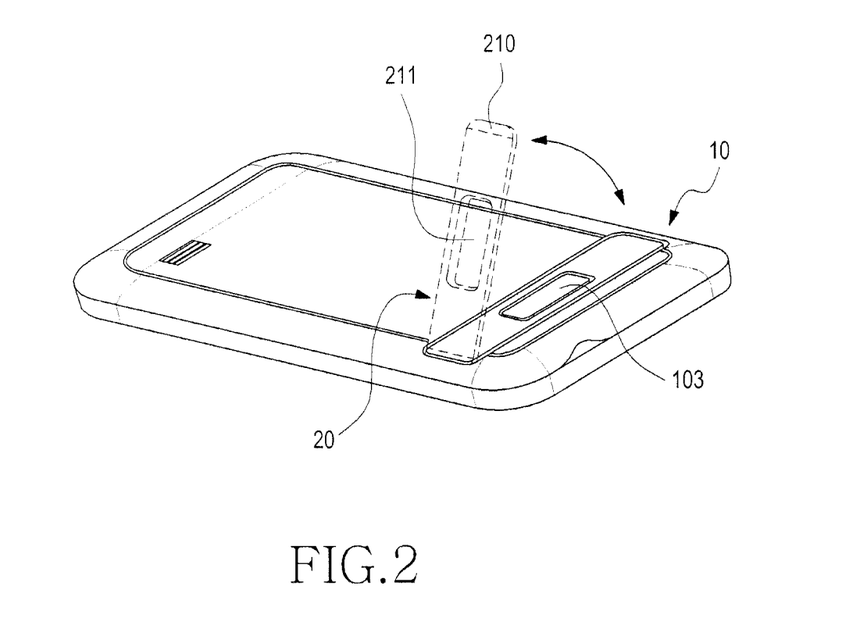
FIG. 2 is a perspective view showing a process in which the cradling apparatus shown in FIG. 1 is open.
Figure 3:
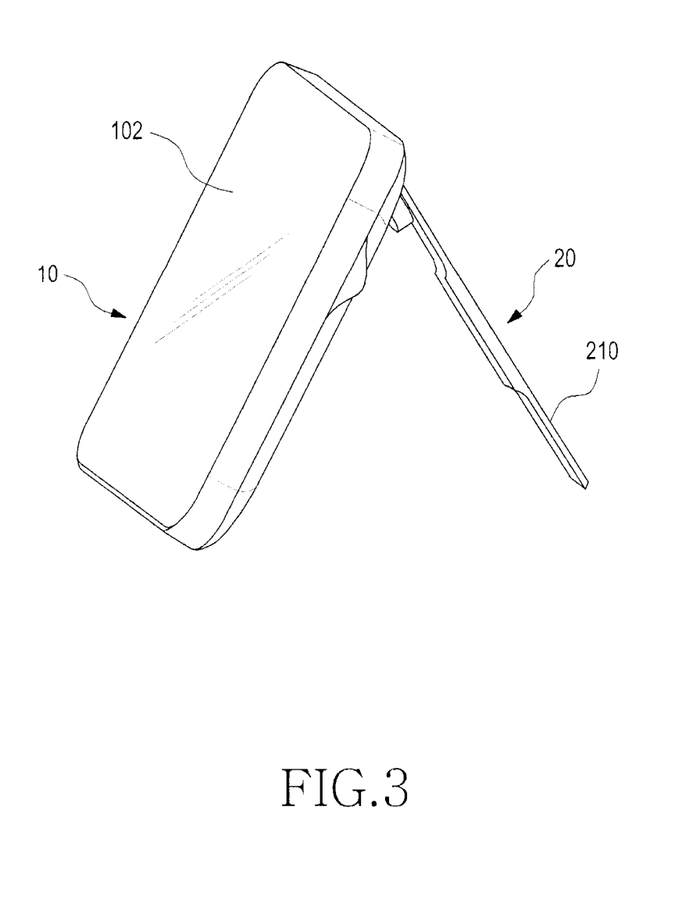
FIG. 3 is a perspective view showing a state in which a main body of a portable terminal is inclinedly supported by the cradling apparatus shown in FIG. 1.

As shown in FIGS. 1 through 3, a cradling apparatus 20 according to the present invention is structured to be slim, such that it is mounted in a predetermined position on a bottom surface 101 of a main body 10 of a portable terminal to inclinedly support a display device 102 provided on the main body 10 of the portable terminal. FIG. 1 shows a state in which a cradling body 210 of the cradling apparatus 20 is closed, FIG. 2 shows a state in which the cradling body 210 is rotated by a predetermined angle, and FIG. 3 shows a state in which the cradling body 210 inclinedly supports the main body 10 of the portable terminal. As shown in FIG. 1, the cradling apparatus 20 is flushed against the back of the terminal in a close state, thus enhancing the slim finish appearance from exterior. In the state shown in FIG. 3, a user can conveniently watch the inclinedly disposed display device 102.

Figure 4:
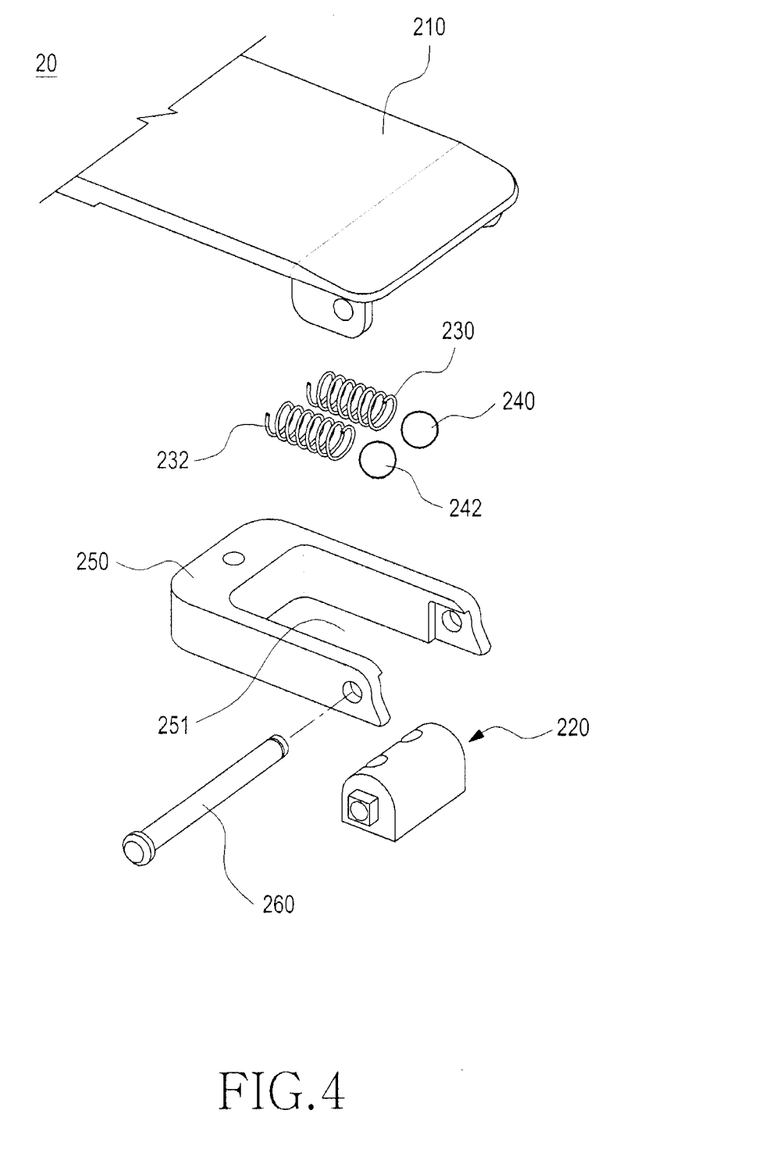
FIG. 4 is an exploded perspective view showing a structure of a cradling apparatus according to the present invention.
Figure 5:
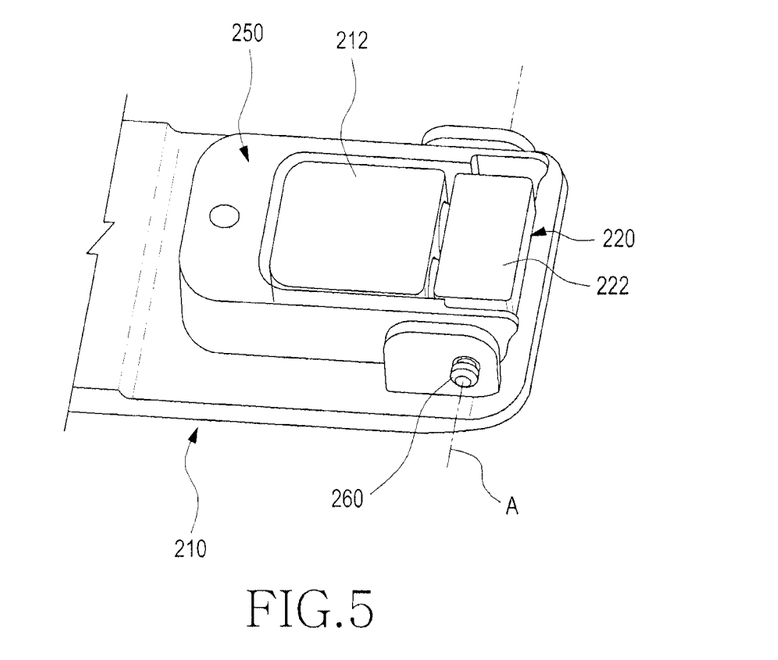
FIG. 5 is an assembled perspective view showing a structure of a cradling apparatus according to the present invention.

With reference to FIGS. 4 and 5, the cradling apparatus 20 includes a cradling body 210 and a retaining device. The cradling body 210 is in the shape of a long bar, such that when the cradling body 210 is closed or rotated by a predetermined angle, it retains the closed state or the rotated state by a force provided from the retaining device. The cradling body 210 forms a predetermined-shape opening (211 of FIG. 2) using the retaining device which includes members 240 and 242, and elastic bodies 230 and 232 provided in a housing 212 of the cradling body 210.

Components of the retaining device are disposed in parallel along an extending direction of the cradling body 210 for slimness. The retaining device interworks with the rotation of the cradling body 210 to support the closed state and rotated state of the cradling body 210.

The retaining device includes a cam 220, the members 240 and 242, and the elastic bodies 230 and 232. The cam 220, the members 240 and 242, and the elastic bodies 230 and 232 are arranged in parallel along the longitudinal direction of the cradling body 210.

The cam 220 is fixed to the bottom surface of the main body of the portable terminal, and the members 240 and 242 and the elastic bodies 230 and 232 are received in the housing 212 of the cradling body 210. The members 240 and 242 determine a retaining position for the cradling body 210 by interworking with the cam 220 according to rotation of the cradling body 210. The members 240 and 242 are preferably in the shape of balls for cam movement with the cam 220. The elastic bodies 230 and 232 are received in the housing 212 along the longitudinal direction of the cradling body 210, and are disposed when being coupled with the members 240 and 242. The elastic bodies 230 and 232 urge the members 240 and 242 to closely contact the cam 220, thereby providing a retaining force for the cradling body 210. The elastic bodies 230 and 233 are preferably compression coil springs. One ends of the elastic bodies 230 and 232 are supported by a side wall of the housing 212, and other ends thereof closely contact the members 240 and 242.

Figure 6:
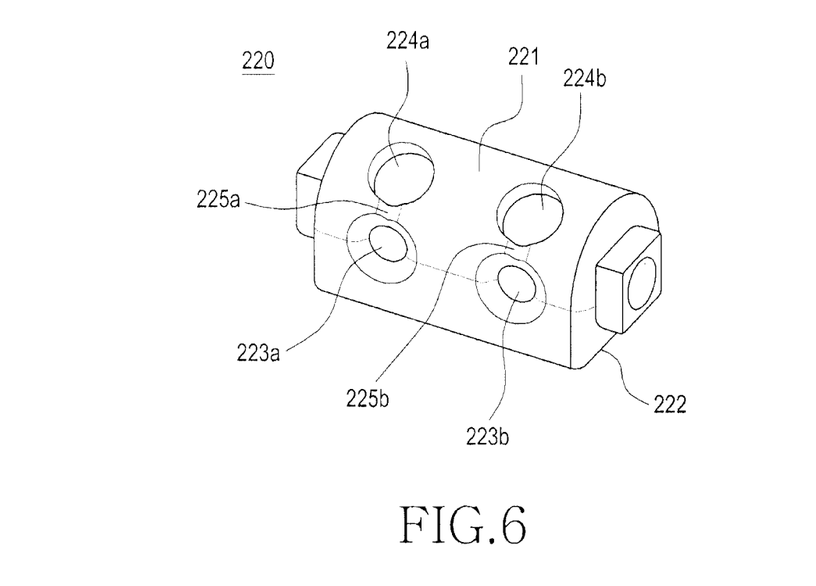
FIG. 6 is a perspective view of a cam used in a cradling apparatus according to the present invention.

As shown in FIG. 6, the cam 220 is disposed to extend along a rotation axis A of the cradling body 210. The cam 220 has to retain a fixed state without being rotated, while facilitating the cam movement with relation to the members (240 and 242 of FIG. 4) during the rotation of the cradling body 210. To this end, an outer surface of the cam 220 includes a cam surface 221 and a flat surface 222. The cam surface 221 is a curved surface to assist the cam movement for the members 240 and 242 according to rotation of the cradling body 210, and the flat surface 222 closely contacts and is fixed to the bottom surface of the main body of the portable terminal to prevent the cam 220 from being rotated by rotation of the cradling body 210.

As show in FIGS. 4 and 5, the cam 220 is fixed to the bottom surface of the main body of the portable terminal by means of a bracket 250 and a shaft 260. The shaft 260 is coupled with the bracket 250 by being assembled to pass through the rotation axis A provided in the cam 220.

As shown in FIGS. 6 and 4, the cam surface 221 has formed therein at least one grooves 223a and 223b, and 224a and 224b for insertably receiving the members (240 and 242 of FIG. 4) thereinto to provide the retaining force for the cradling body 210. The grooves provide the retaining force for the cradling body 210 through a coupling force between the members (240 and 242 of FIG. 4) and the elastic bodies (230 and 232 of FIG. 4). The grooves include first grooves 223a and 223b and second grooves 224a and 224b. The members 240 and 242 are inserted into the first grooves 223a and 223b to retain the closed state of the cradling body 210. The second grooves 224a and 224b are disposed in parallel with the first grooves 223a and 223b along a rotation path of the members 240 and 242 during the rotation of the cradling body 210, and the members 240 and 242 are inserted into the second grooves 224a and 224b to retain the rotated state of the cradling body 210. To improve the retaining force for the closed state and the rotated state of the cradling body 210, components are preferably configured in pairs. That is, the elastic bodies 230 and 232, the members 240 and 242, the first grooves 223a and 223b, and the second grooves 224a and 224b are preferably configured in pairs.

Between the first grooves 223a and 223b and the second grooves 224a and 224b are provided connection grooves 225a and 225b. The connection grooves 225a and 225b guide moving paths when the members 240 and 242 transitions from the first grooves 223a and 223b to the second grooves 224a and 224b and from the second grooves 224a and 224b to the first grooves 223a and 223b during the rotation of the cradling body 210. The connection grooves 225a and 225b are also intended to facilitate when the members 240 and 242 are inserted into or leave the first grooves 223a and 223b or are inserted into or leave the second grooves 224a and 224b. In other words, the connection grooves 225a and 225b serve to make rotation of the cradling body 210 smooth. The shape of the first grooves 223a and 223b and the shape of the second grooves 224a and 224b are different from each other. In other words, the first grooves 223a and 223b are in an approximately semi-conical shape and the second grooves 224a and 224b are in an approximately cylindrical shape. This is because the retaining force for the cradling body 210 needs to be larger in the rotated state of the cradling body 210 than in the closed state of the cradling body 210.

While the first grooves 223a and 223b and the second grooves 224a and 224b are formed in the cam 220 to provide the retaining force for the closed state of the cradling body 210 and the rotated state of the cradling body 210 by a first angle in the present invention, the present invention is not limited thereto. Thus, to variously configure the cradling angle of the main body of the portable terminal, a third groove and a fourth groove may be additionally formed in the cam 220 to provide additional open states.

As shown in FIGS. 4 and 5, the bracket 250 is mounted on the bottom surface of the main body of the portable terminal to fix the shaft 260 and the cradling body 210 onto the bottom surface of the main body or a predetermined location of the portable terminal. The cradling body 210 is mounted by the bracket 250 to be rotated around the shaft 260, and the cam 220 maintains fixably coupled to the bracket 250 with the help of the shaft 260. On end portions of the bracket 250 are provided with openings for passing the shaft 260 therethrough.

In the closed state of the cradling body 210, the bracket 250 includes an open space 251 which entirely receives the housing 212, thus contributing to the slimness of the cradling apparatus 20. That is, when the cradling body 210 is in the closed state, the bracket 250, the housing 212, and the cam 220 are arranged linearly in parallel along the longitudinal direction of the cradling body 210. Such arrangement is favorable to the slimness of the cradling apparatus 20.

Figure 7:
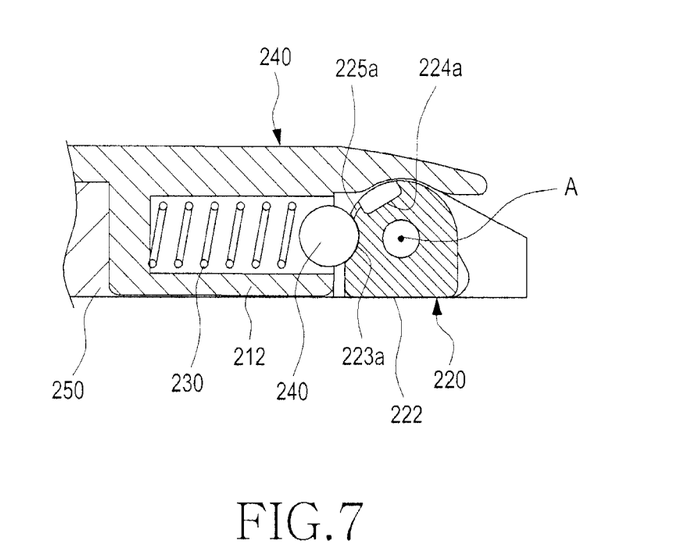
FIG. 7 is a cross-sectional view showing a structure of a cradling apparatus in a closed state according to the present invention.
Figure 8:
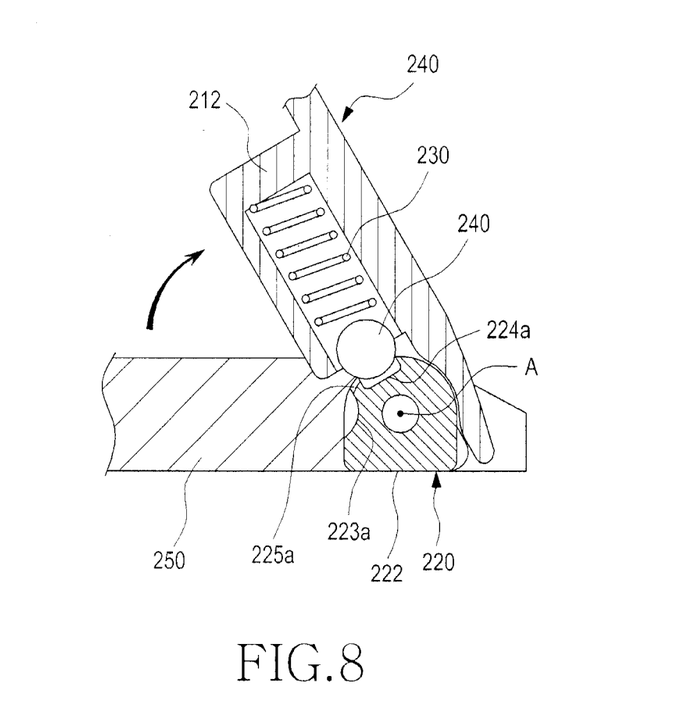
FIG. 8 is a cross-sectional view showing a structure of a cradling apparatus in an open state according to the present invention.

Referring to FIGS. 7 and 8, opening and closing operations of the cradling apparatus 20 will be described. FIG. 7 shows the closed state of the cradling body 210, and FIG. 8 shows the rotated state of the cradling body 210. In the closed state of the cradling body 210 as shown in FIG. 7, the members 240 and 242 retain their states of being inserted into the first grooves 223a and 223b while being supported by the elastic bodies 230 and 232. Such a retaining force retains the closed state of the cradling body 210. When a user rotates the cradling body 210 by a predetermined angle, the members 240 and 242 leave the first grooves 223a and 223b, pass the connection grooves 224a and 225b, and then are inserted into the second grooves 224a and 224b. The retaining force retains the rotated state of the cradling body 210. During this operation, the elastic bodies 230 and 232 are contracted and stretched along the longitudinal direction of the cradling body 210.

As shown in FIGS. 1 and 2, a receiving recess (not shown) for receiving the cradling body 210 of the cradling apparatus 20 is formed to be recessed to a predetermined depth from the bottom surface 101 of the main body 10 of the portable terminal. The cradling apparatus 20 includes a holder for supporting the cradling body 210 in the closed state. The holder includes a protrusion 103 and an opening 211. In the center of the receiving recess is provided the protrusion 103 to keep the closed state of the cradling body 210. The cradling body 210 includes the opening 211 corresponding to the protrusion 103. When the cradling body 210 shown in FIG. 1 is received in the receiving recess, the opening 211 is completely coupled with the protrusion 103, and coupling between the opening 211 and the protrusion 103 prevents the cradling body 210 in the closed state from moving.

As is apparent from the foregoing description, the present invention is favorable to providing a cradling apparatus for a slim portable terminal by disposing the retaining force for providing a force to the cradling body in parallel along the extending direction of the cradling body and disposing the grooves in the cam. The slim cradling apparatus does not act as a restriction factor in designing the exterior of the portable terminal in view of a designer. A user may not even aware there is a cradling device when carrying around the terminal during daily usage.

While a detailed embodiment has been described in the present invention, it would be obvious to those of ordinary skill in the art that various changes may be made without departing from the scope of the present invention.

What is claimed is:

1. A cradling apparatus for inclinedly supporting a main body of a portable terminal, comprising:
   a cradling body;
   a cradling body housing situated on the cradling body;
   a cam arranged for supporting a closed state and a rotated state of the cradling body;
   a member disposed at least partially in the cradling body housing and arranged for engaging the cam;
   a shaft passing through the cam, wherein the cradling body is rotatably coupled to the cam via the shaft, and wherein the shaft is situated outside of the cradling body housing; and
   an elastic body disposed at least partially in the cradling body housing and arranged for urging the member towards the cam in a direction that is transverse to an axis of rotation of the cradling body around the cam.

2. The cradling apparatus of claim 1, wherein:
   the member is arranged for closely contacting the cam, thus providing a retaining force for the cradling body; and
   the member has a substantially spherical shape.

3. The cradling apparatus of claim 1, wherein the cradling body is provided on a bottom surface thereof with a housing for receiving the member and the elastic body.

4. The cradling apparatus of claim 1, wherein the cam is disposed to extend along the rotation axis of the cradling body, and an outer surface thereof comprises:
   a cam surface having a curved surface; and
   a flat surface for preventing the cam from being rotated by rotation of the cradling body, the flat surface being closely fixed to a predetermined position on of the main body of the portable terminal.

5. The cradling apparatus of claim 4, wherein the cam surface comprises at least one groove for providing a retaining force for the cradling body by inserting the members thereinto.

6. The cradling apparatus of claim 5, wherein the grooves comprise:
   first grooves for retaining the closed state of the cradling body by receiving the members thereinto; and
   second grooves for retaining the rotated state of the cradling body by receiving the members thereinto, the second grooves being positioned in parallel with the first grooves along a rotation path of the members.

7. The cradling apparatus of claim 6, wherein the members, the elastic bodies, the first grooves, and the second grooves are provided in pairs.

8. The cradling apparatus of claim 6, further comprising connection grooves between the first grooves and the second grooves, each of the connection grooves connecting a respective pair of a first groove and a second groove.

9. The cradling apparatus of claim 3, wherein the cradling body is rotatably mounted by means of a shaft disposed to pass through the rotation axis provided in the cam and a bracket coupled with the shaft to be fixed to the bottom surface of the main body of the portable terminal.

10. The cradling apparatus of claim 9, wherein when the cradling body is in the closed state, the bracket provides an open space for entirely enclosing the cradling body housing.

11. The cradling apparatus of claim 1, further comprising a holder for supporting the closed state of the cradling body.

12. The cradling apparatus of claim 11, wherein the holder comprises:
   a protrusion provided in a predetermined position on the bottom surface of the main body of the portable terminal; and
   an opening for inserting the protrusion thereinto to prevent a movement of the cradling body.

13. The cradling apparatus of claim 6, wherein the shape of the first grooves and the shape of the second grooves are different from each other, such that a retaining force for retaining the rotated state of the cradling body provided in insertion of the members into the second grooves is larger than a retaining force for retaining the closed state of the cradling body provided in insertion of the members into the first grooves.

14. A terminal comprising:
   a terminal housing;
   a cradling body rotatably coupled to the terminal housing;
   at least one substantially spherical member received in the cradling body;
   a cam coupled to the terminal housing and arranged for supporting a closed state and a rotated state of the cradling body, the cam having a curved surface, the curved surface having a first groove in which the substantially spherical member is at least partially disposed when the cradling body is in the closed state and a second groove in which the substantially spherical member is at least partially disposed when the cradling body is in the open state; and
   at least one elastic body received in the cradling body, coupled with the at least one substantially spherical member, and arranged for urging the at least one substantially spherical member to contact the cam and enter one of the first groove and the second groove when the cradling body is rotated, thus providing a retaining force for the cradling body.

15. The terminal of claim 14, wherein the terminal housing includes a recess and a protrusion rising from a bottom of the recess to accommodate the cradling body, the cradling body further including an opening to receive the protrusion during the closed state.

16. The terminal of claim 14, wherein the cam is disposed to extend along a rotation axis of the cradling body, the cam further having a flat surface for preventing the cam from being rotated by rotation of the cradling body, the flat surface being closely fixed to a predetermined position on the terminal housing.

17. The terminal of claim 14, wherein the cam is fixedly coupled to the terminal housing and hingedly coupled to the cradling body.

18. The terminal of claim 14, wherein the curved surface of the cam includes a connection groove between the first groove and the second groove.

19. The terminal of claim 14, further comprising a holder for supporting the closed state of the cradling body.

\* \* \* \* \*

UNITED STATES PATENT AND TRADEMARK OFFICE
CERTIFICATE OF CORRECTION

| | | |
|---|---|---|
| PATENT NO. | : 8,767,395 B2 | Page 1 of 1 |
| APPLICATION NO. | : 13/345822 | |
| DATED | : July 1, 2014 | |
| INVENTOR(S) | : Yoo | |

It is certified that error appears in the above-identified patent and that said Letters Patent is hereby corrected as shown below:

In the Claims

Column 5, Claim 4, Line 51 should read:
--...position on the main...--

Signed and Sealed this
Second Day of September, 2014

Michelle K. Lee
*Deputy Director of the United States Patent and Trademark Office*